United States Patent
Liu et al.

(10) Patent No.: US 8,996,062 B2
(45) Date of Patent: Mar. 31, 2015

(54) WORKING METHOD OF MULTI-MODE TERMINAL AND MULTI-MODE TERMINAL

(71) Applicant: Huawei Technologies Co., Ltd., Shenzhen, Guangdong (CN)

(72) Inventors: Jiwu Liu, Beijing (CN); Zhe Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 13/797,759

(22) Filed: Mar. 12, 2013

(65) Prior Publication Data
US 2013/0267226 A1  Oct. 10, 2013

(30) Foreign Application Priority Data
Mar. 28, 2012  (CN) .......................... 2012 1 0086336

(51) Int. Cl.
| H04M 1/00 | (2006.01) |
|---|---|
| *H04W 88/06* | (2009.01) |
| *H04W 48/18* | (2009.01) |
| H04W 68/00 | (2009.01) |
| H04W 48/20 | (2009.01) |
| H04W 4/00 | (2009.01) |

(52) U.S. Cl.
CPC .............. *H04W 88/06* (2013.01); *H04W 68/00* (2013.01); *Y02B 60/50* (2013.01); *H04W 48/20* (2013.01); *H04W 4/003* (2013.01); *H04W 48/18* (2013.01)
USPC ...................... 455/552.1; 455/432.1; 455/436; 455/558; 455/553.1; 370/252; 370/331

(58) Field of Classification Search
CPC ..... H04W 76/02; H04W 84/04; H04W 88/04; H04W 88/06; H04W 68/00; H04W 48/20; H04W 4/003; Y02B 60/50
USPC ................ 455/432.1, 436, 552.1, 553.1, 558; 370/352, 331, 252
See application file for complete search history.

(56) References Cited

U.S. PATENT DOCUMENTS

| 7,715,829 | B2 * | 5/2010 | Li et al. ........................... 455/417 |
|---|---|---|---|
| 8,018,865 | B2 * | 9/2011 | Fan et al. ........................ 370/252 |
| 8,565,722 | B1 * | 10/2013 | Cheuk et al. ................... 455/408 |
| 8,565,765 | B2 * | 10/2013 | Anantharaman et al. .. 455/435.2 |
| 8,874,167 | B2 * | 10/2014 | Qiu et al. ....................... 455/557 |
| 8,874,168 | B2 * | 10/2014 | Luo ................................ 455/558 |

(Continued)

FOREIGN PATENT DOCUMENTS

| CN | 101505525 A | 8/2009 |
|---|---|---|
| CN | 101715227 A | 5/2010 |

*Primary Examiner* — Olumide T Ajibade Akonai
(74) *Attorney, Agent, or Firm* — Leydig, Voit & Mayer, Ltd.

(57) ABSTRACT

The present invention discloses a working method of a multi-mode terminal and a multi-mode terminal and relates to the field of communications technologies, which can implement switching between multi-mode multi-standby and multi-mode single-standby, and improve user experience. The working method of a multi-mode terminal includes: determining, according to a network where a terminal currently camps, a currently applicable working mode of the terminal, where the currently applicable working mode is a multi-mode multi-standby mode and a multi-mode single-standby mode; and configuring a working mode of the terminal to the currently applicable working mode of the terminal. The present invention may be applied to the field of communications technologies.

11 Claims, 4 Drawing Sheets

```
101: Determine, according to a network where a terminal
     currently camps, a currently applicable working mode of
     the terminal, where the currently applicable working mode
     is a multi-mode multi-standby mode or a multi-mode
     single-standby mode 102: Configure a working mode of the terminal to the currently
     applicable working mode of the terminal
```

(56) References Cited

U.S. PATENT DOCUMENTS

| | | | |
|---|---|---|---|
| 2003/0125073 A1* | 7/2003 | Tsai et al. | 455/552 |
| 2004/0147260 A1* | 7/2004 | Kim | 455/432.1 |
| 2004/0223477 A1* | 11/2004 | Iwasaki et al. | 370/338 |
| 2006/0262800 A1* | 11/2006 | Martinez et al. | 370/395.52 |
| 2007/0177617 A1* | 8/2007 | Noh et al. | 370/401 |
| 2007/0237121 A1* | 10/2007 | Khandelwal et al. | 370/338 |
| 2008/0051151 A1* | 2/2008 | Bumiller | 455/564 |
| 2008/0220756 A1* | 9/2008 | Liu | 455/417 |
| 2008/0293407 A1* | 11/2008 | Cormier et al. | 455/433 |
| 2009/0247241 A1* | 10/2009 | Gollnick et al. | 455/574 |
| 2010/0113089 A1* | 5/2010 | Suzuki et al. | 455/552.1 |
| 2010/0330986 A1* | 12/2010 | Rahman et al. | 455/432.1 |
| 2011/0086621 A1* | 4/2011 | Son et al. | 455/414.1 |
| 2011/0274045 A1* | 11/2011 | Wu | 370/328 |
| 2011/0319074 A1* | 12/2011 | Adams et al. | 455/432.1 |
| 2012/0003958 A1* | 1/2012 | Hossain et al. | 455/411 |
| 2012/0069758 A1* | 3/2012 | Kim et al. | 370/252 |

\* cited by examiner

WORKING METHOD OF MULTI-MODE TERMINAL AND MULTI-MODE TERMINAL

CROSS-REFERENCE TO RELATED APPLICATIONS

This application claims priority to Chinese Patent Application No. 201210086336.5, filed on Mar. 28, 2012, which is hereby incorporated by reference in its entirety.

FIELD OF THE INVENTION

The present invention relates to the field of communications technologies, and in particular, to a working method of a multi-mode terminal and a multi-mode terminal.

BACKGROUND OF THE INVENTION

With the rapid development of communications technologies, increasingly higher requirements are imposed on mobile terminals such as mobile phones. In order to satisfy growing demands for communications, a multi-mode terminal technology, capable of supporting two or more types of modes at the same time, has been developed so far. In the multi-mode terminal technology, a multi-mode single-standby terminal means that when a terminal device works, only a set of radio frequency channels work for a certain mode at the same time; and a multi-mode multi-standby terminal means that when a terminal device works, multiple sets of radio frequency channels corresponding to multiple modes work at the same time. A most common application of multi-mode multi-standby is multi-mode dual-standby.

However, a multi-mode dual-standby technology has not been stipulated by a protocol standard so far, and therefore, a multi-mode dual-standby terminal is generally required to be separately registered for a CS (Circuit Switched, circuit switched) domain and a PS (Packet Switched, packet switched) domain, instead of co-registration. When the multi-mode dual-standby terminal roams out of network coverage of a communications operator (such as China Mobile), the terminal generally can work in only one of the CS domain and the PS domain. When the terminal roams out of the network coverage of China Mobile, for example, only the CS domain is available, at this time, a roaming user can use only modes camping on the CS domain such as GSM, TDS-CDMA, and WCDMA, but cannot use modes such as LTE and WCDMA in the PS domain through inter-system interoperations such as co-registration, CSFB and multi-mode single-standby.

SUMMARY OF THE INVENTION

Embodiments of the present invention provide a working method of a multi-mode terminal and a multi-mode terminal, which can implement switching between multi-mode multi-standby and multi-mode single-standby and improve user experience.

To achieve the foregoing objective, the embodiments of the present invention adopt the following technical solutions.

A working method of a multi-mode terminal includes:
 determining, according to a network where a terminal currently camps, a currently applicable working mode of the terminal, where the currently applicable working mode is a multi-mode multi-standby mode or a multi-mode single-standby mode; and
 configuring a working mode of the terminal to the currently applicable working mode of the terminal.

A multi-mode terminal includes:
 a determining unit, configured to determine, according to a network where a terminal currently camps, a currently applicable working mode of the terminal, where the currently applicable working mode is a multi-mode multi-standby mode or a multi-mode single-standby mode; and
 a configuring unit, configured to configure a working mode of the terminal to the currently applicable working mode of the terminal.

With the working method of a multi-mode terminal and the multi-mode terminal provided in the embodiments of the present invention, a currently applicable working mode of a terminal can be determined according to a network where the terminal currently camps, and further, a working mode of the terminal is configured to the currently applicable working mode of the terminal, thereby implementing switching between multi-mode single-standby and multi-mode multi-standby, namely, supporting a multi-mode single-standby working mode and a multi-mode multi-standby working mode at the same time, enabling a user to enjoy multiple modes when roaming among different networks, and improving user experience.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following descriptions merely show some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
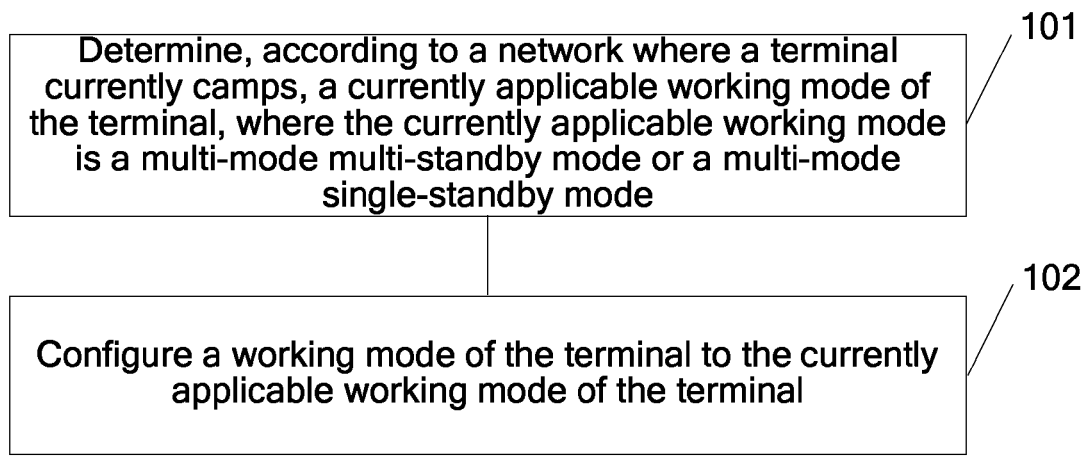
FIG. 1 is a flow chart of a working method of a multi-mode terminal according to an embodiment of the present invention.

The present invention provides a working method of a multi-mode terminal, and as shown in FIG. 1, the method includes:

101: Determine, according to a network where a terminal currently camps, a currently applicable working mode of the terminal, where the currently applicable working mode is a multi-mode multi-standby mode or a multi-mode single-standby mode.

The multi-mode terminal can support multiple modes at the same time, the multi-mode means supporting multiple modes, and the multiple modes may include at least two types of: GSM (Global System for Mobile Communications, global system for mobile communications), CDMA (Code Division Multiple Access, code division multiple access) 2000, TDS-CDMA (Time Division-Synchronous Code Division, time division-synchronous code division multiple access technology), WCDMA (Wideband Code Division Multiple Access, wideband code division multiple access) and LTE (Long Term Evolution, long term evolution) modes, definitely, which is not limited in the embodiments of the present invention, and the multi-mode may further include another type of mode.

The currently applicable working mode of the terminal is a multi-mode multi-standby mode or a multi-mode single-standby mode. The multi-mode single-standby mode is stipulated by the 3GPP (3rd Generation Partnership Project, 3rd generation partnership project) protocol standard, but the multi-mode multi-standby mode has not been stipulated by a protocol standard so far, which causes that the multi-mode multi-standby mode is not available in all networks. For example, when the terminal roams between different countries or regions, the multi-mode multi-standby mode may not be normally used. In this step, preferably, when the multi-mode multi-standby mode is unavailable in the network where the terminal currently camps, the currently applicable working mode of the terminal is determined as the multi-mode single-standby mode, and in other cases, the currently applicable working mode of the terminal is determined as the multi-mode multi-standby mode.

A specific example is taken in the following to illustrate a case that the multi-mode multi-standby is unavailable in the network where the terminal currently camps.

One or more modes of the multi-mode multi-standby may be in a working status in each of a PS domain and a CS domain. However, because the multi-mode multi-standby is not stipulated by a protocol standard, after roaming out of network coverage of a certain communications operator, the terminal can work in only one of the CS domain and the PS domain. For example, when the terminal can work in only the CS domain, a mode camping on the CS domain (such as GSM and TDS-CDMA) is available, but a mode camping on the PS domain (such as LTE) is unavailable, namely, at this time, the multi-mode multi-standby cannot provide a service for a user normally. That is, at this time, the multi-mode multi-standby is not an applicable working mode of the network where the terminal currently camps. The currently applicable working mode of the terminal should be determined as the multi-mode single-standby mode.

Specifically, in the embodiments of the present invention, an MCC (Mobile Country Code, mobile country code) and/or an MNC (Mobile Network Code, mobile network code) of the network where the terminal currently camps may be searched, and further the currently applicable working mode of the terminal is determined according to the MCC and/or the MNC. For example, after the terminal roams to network coverage of a certain China communications operator, a searched MCC of the network where the terminal currently camps is 460 (China), and the currently applicable working mode of the terminal may be determined as the multi-mode multi-standby mode. Persons skilled in the art may further determine the currently applicable working mode of the terminal according to other common senses or common technical means in the art, which is not limited in the embodiments of the present invention.

102: Configure a working mode of the terminal to the currently applicable working mode of the terminal.

Specifically, if the currently applicable working mode of the terminal is the multi-mode multi-standby mode, the working mode of the terminal is configured to the multi-mode multi-standby mode; and if the currently applicable working mode of the terminal is the multi-mode single-standby mode, the working mode of the terminal is configured to the multi-mode single-standby mode.

If the applicable working mode of the terminal, which is determined in step 101 according to the network where the terminal camps, is multi-mode multi-standby, the working mode of the terminal is configured to a multi-mode multi-standby working mode in step 102. Specifically, a physical layer and a radio frequency channel of the terminal are configured to the multi-mode multi-standby mode. Multiple sets of radio frequency channels of the terminal are used for multiple different modes, so that the multiple modes are in a working status at the same time. Correspondingly, a mode of high-layer software of the terminal is configured to the multi-mode multi-standby mode.

If the applicable working mode of the terminal, which is determined in step 101 according to the network where the terminal camps, is multi-mode single-standby, the working mode of the terminal is configured to a multi-mode single-standby working mode in step 102. Specifically, a physical layer and a radio frequency channel of the terminal are configured to the multi-mode single-standby mode, where the multiple sets of radio frequency channels of the terminal are selected and used for one mode, thereby implementing characteristics of the multi-mode single-standby such as co-registration, CSFB (Circuit Switched Fallback, circuit switched fallback) and multi-mode interoperations. Correspondingly, the mode of the high-layer software of the terminal is configured to the multi-mode single-standby mode.

In this step, the working mode of the terminal may be automatically configured to the currently applicable working mode of the terminal. Automatic configuration for the terminal is that after the currently applicable working mode of the terminal is determined, the working mode of the terminal is automatically configured to a determined working mode without a user operation. In addition, the user may also be prompted to manually configure the working mode of the terminal to the currently applicable working mode of the terminal, namely, after the currently applicable working mode of the terminal is determined, prompt information is output to prompt the user whether to configure the working mode of the terminal to the determined working mode, and then the terminal is configured according to an instruction of the user.

With the working method of a multi-mode terminal provided in this embodiment of the present invention, a currently applicable working mode of a terminal can be determined according to a network where the terminal currently camps, and further, a working mode of the terminal is configured to the currently applicable working mode of the terminal, thereby implementing switching between multi-mode single-standby and multi-mode multi-standby, namely, supporting a multi-mode single-standby working mode and a multi-mode multi-standby working mode at the same time, enabling a user to enjoy multiple modes when roaming among different networks, and improving user experience.

Figure 2:
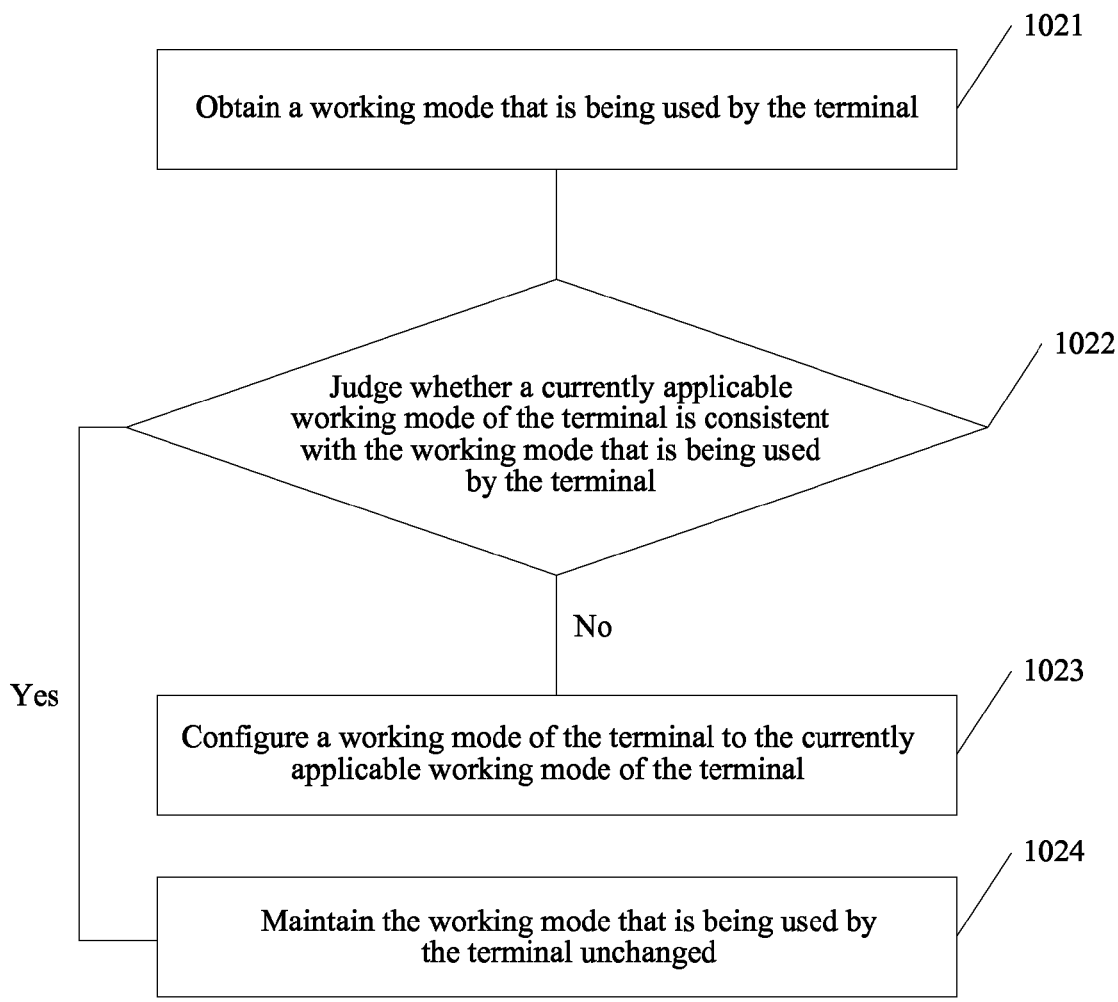
FIG. 2 is a flow chart of a working method of a multi-mode terminal according to another embodiment of the present invention.

Further, in an embodiment provided in the present invention, as shown in FIG. 2, step 102 specifically includes:

1021: Obtain a working mode that is being used by a terminal.

1022: Judge whether a currently applicable working mode of the terminal is consistent with the working mode that is being used by the terminal, and if not, execute step 1023, while if yes, execute step 1024.

1023: Configure the working mode of the terminal to the currently applicable working mode of the terminal.

In this step, a physical layer and a radio frequency channel are configured to the currently applicable working mode of the terminal, and a work mode of corresponding high-layer software of the terminal is also configured to the currently applicable working mode of the terminal.

1024: Maintain the working mode that is being used by the terminal unchanged.

That is, no further operation is performed on the current physical layer and the radio frequency channel of the terminal, and the working mode that is being used by the terminal is maintained.

Before the terminal is configured, it is first judged whether the currently applicable working mode of the terminal is consistent with the working mode that is being used by the terminal, and the terminal is configured only when the two working modes are inconsistent, which makes the terminal more intelligent, saves storage space and operation time, and improves user experience.

In order to better illustrate the working method of a multi-mode terminal provided in this embodiment of the present invention, a working method of a terminal in two specific application scenarios where a multi-mode multi-standby mode is specifically a multi-mode dual-standby mode is illustrated in detail in the following.

Embodiment 1

A working method when a terminal roams out of network coverage of a China communications operator.

Figure 3:
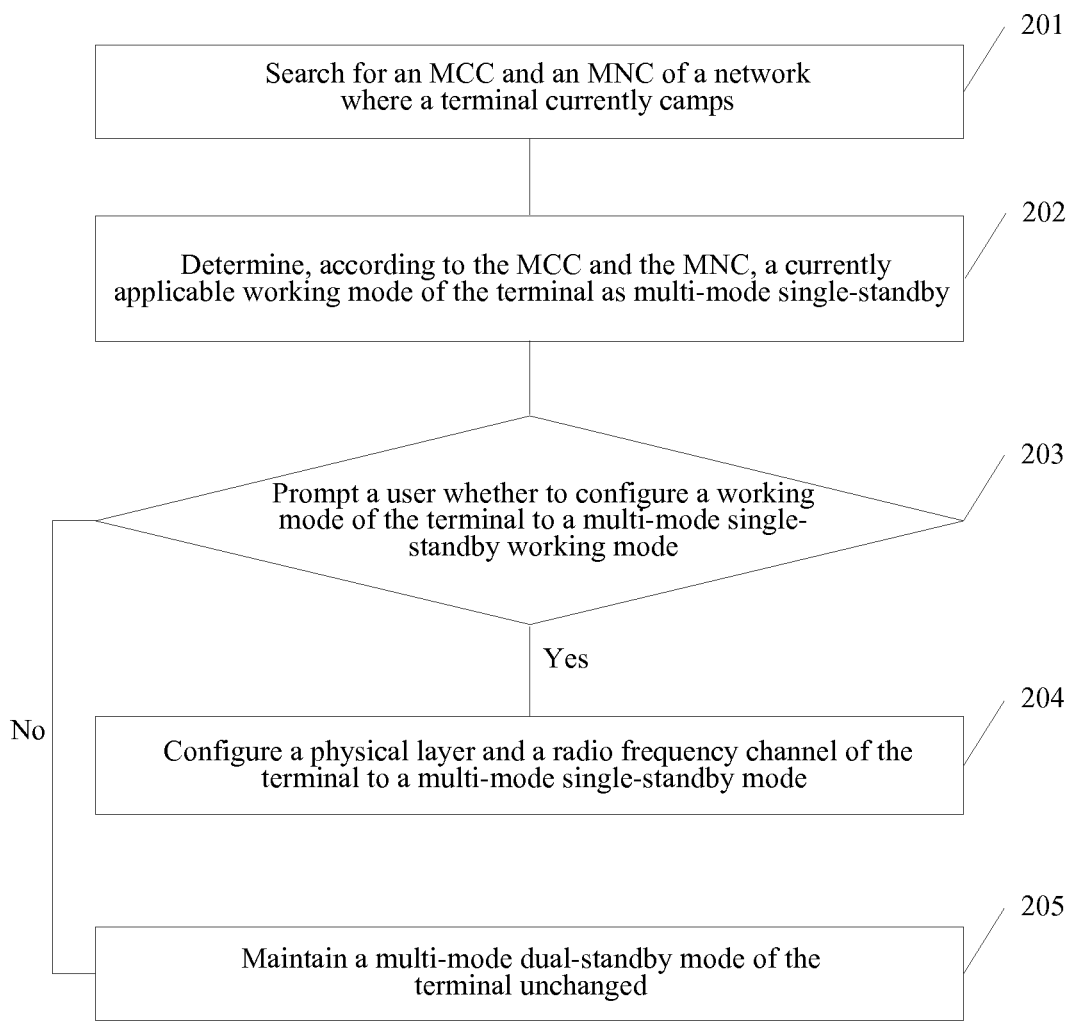
FIG. 3 is a flow chart of a working method of a multi-mode terminal according to Embodiment 1 of the present invention.

When a terminal is still in network coverage of a China communications operator, a working mode is GTWL (GPS, TDS-CDMA, WCDMA and LTE multi-mode) multi-mode dual-standby: (GSM (CS)+(TDS-CDMA/WCDMA/TD-LTE) (PS)). A GSM mode camps on a CS domain, and TDS-CDMA, WCDMA and TD-LTE modes camp on a PS domain. At this time, the GSM mode camping on the CS domain and the TDS-CDMA mode camping on the PS domain are in a working status. When the terminal roams out of the network coverage of the China communications operator, as shown in FIG. 3, the method includes:

201: Search for an MCC and an MNC of a network where a terminal currently camps.

If the MCC is 250 (Russia) and the MNC is 99, it can be known that the terminal roams out of network coverage of a China communications operator. At this time, in the network where the terminal currently camps, multi-mode dual-standby is unavailable.

202: Determine, according to the MCC and the MNC, a currently applicable working mode of the terminal as multi-mode single-standby.

203: Prompt a user whether to configure a working mode of the terminal to a multi-mode single-standby working mode.

In this step, a popup text box "The current network is inapplicable to a multi-mode CS domain and PS domain dual-standby mode. Work in a multi-mode single-standby working mode or not?" and check boxes "yes" and "no" may be specifically adopted. If the user selects "yes" according to the prompt, step 204 is executed, and if the user selects "no", step 205 is executed.

204: Configure a physical layer and a radio frequency channel of the terminal to a multi-mode single-standby mode.

In this embodiment, the foregoing step specifically includes that corresponding software of the terminal is reinitialized, a TDS-CDMA mode that is not supported by a foreign operator is closed, a WCDMA mode that is supported by the foreign operator is started, and a mode of corresponding high-layer software of the terminal is also configured to the multi-mode single-standby mode, co-registration is initiated, GWL (GSM, WCDMA, and TD-LTE) multi-mode interoperations are started, and a mode of the terminal is configured to a GWL multi-mode single-standby mode.

205: Maintain a multi-mode dual-standby mode of the terminal unchanged.

Embodiment 2

A working method when a terminal roams to network coverage of a China communications operator.

Figure 4:
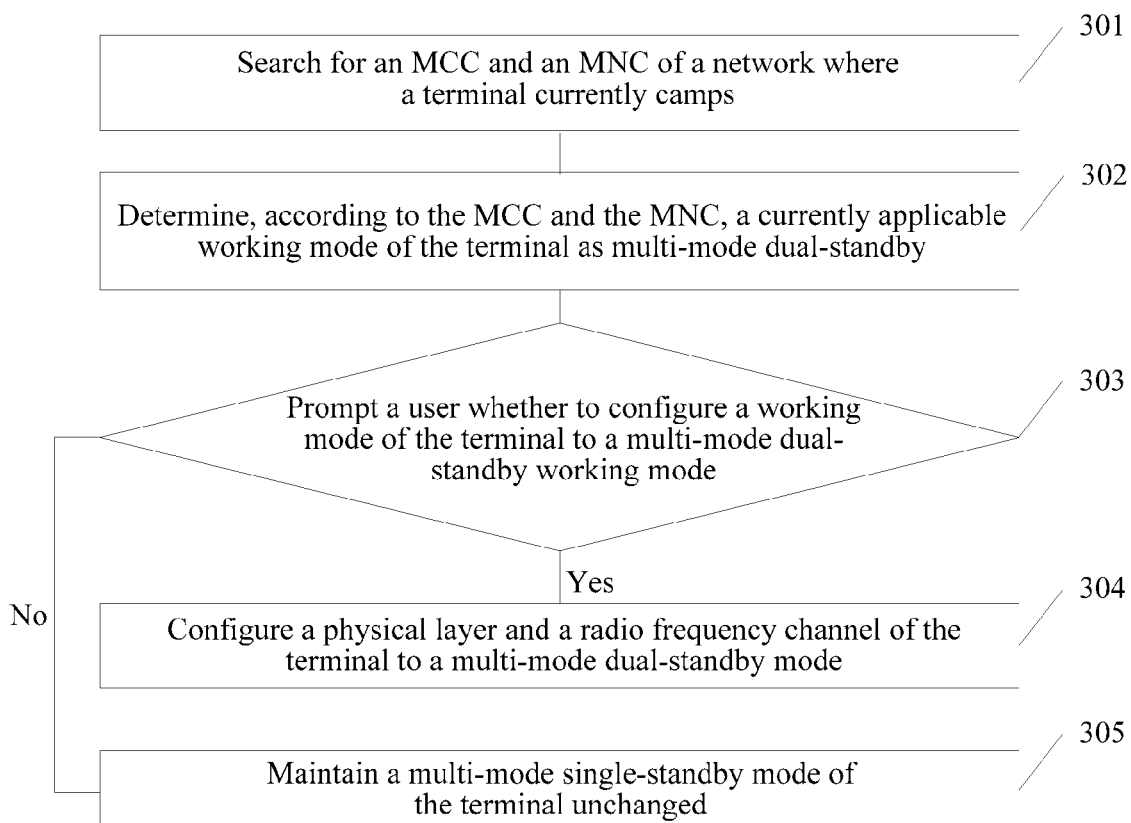
FIG. 4 is a flow chart of a working method of a multi-mode terminal according to Embodiment 2 of the present invention.

A terminal in this embodiment is the same as the terminal in Embodiment 1, and is in a GWL multi-mode single-standby working mode. When the terminal roams to network coverage of a China communications operator, as shown in FIG. 4, the method includes:

301: Search for an MCC and an MNC of a network where a terminal currently camps.

If the MCC is 460 (China) and the MNC is 00, it can be known that the terminal roams to network coverage of a China communications operator. At this time, in the network coverage of the China communications operator, multi-mode dual-standby is available.

302: Determine, according to the MCC and the MNC, a currently applicable working mode of the terminal as multi-mode dual-standby.

303: Prompt a user whether to configure a working mode of the terminal to a multi-mode dual-standby working mode.

In this step, a popup text box "The current network is applicable to a multi-mode CS domain and PS domain dual-standby mode. Work in a multi-mode dual-standby working mode or not?" and check boxes "yes" and "no" may be specifically adopted. If the user selects "yes" according to the prompt, step 304 is executed, and if the user selects "no", step 305 is executed.

304: Configure a physical layer and a radio frequency channel of the terminal to a multi-mode dual-standby mode.

In this embodiment, the foregoing step specifically includes that corresponding software of the terminal is reinitialized, a TDS-CDMA mode that is supported by the China communications operator is started, and a mode of corresponding high-layer software of the terminal is also configured to the multi-mode dual-standby mode. At this time, the terminal is restored to an initial multi-mode dual-standby working mode, that is, GTWL (GPS, TDS-CDMA, WCDMA and LTE multi-mode) multi-mode dual-standby: (GSM (CS)+(TDS-CDMA/WCDMA/TD-LTE) (PS)). A GSM mode camps on a CS domain, and TDS-CDMA, WCDMA and TD-LTE modes camp on a PS domain. At this time, the GSM mode camping on the CS domain and the TDS-CDMA mode camping on the PS domain are in a working status.

305: Maintain a multi-mode single-standby mode of the terminal unchanged.

Figure 5:
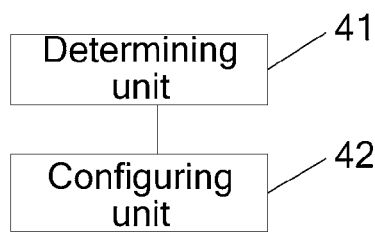
FIG. 5 is a structural block diagram of a multi-mode terminal according to an embodiment of the present invention.

Corresponding to the foregoing working method of a multi-mode terminal, the present invention provides a multi-mode terminal, and as shown in FIG. 5, the multi-mode terminal includes a determining unit 41 and a configuring unit 42.

The multi-mode terminal can support multiple modes at the same time, the multi-mode means supporting multiple modes, and the multiple modes may include at least two types of: GSM, CDMA2000, TDS-CDMA, WCDMA, and LTE, which is not limited in this embodiment of the present invention, and the multi-mode may further include another type of mode.

The determining unit 41 is configured to determine, according to a network where a terminal currently camps, a currently applicable working mode of the terminal, where the currently applicable working mode is a multi-mode multi-standby mode or a multi-mode single-standby mode.

The configuring unit 42 is configured to configure a working mode of the terminal to the currently applicable working mode of the terminal.

Specifically, if the currently applicable working mode of the terminal is the multi-mode multi-standby mode, the configuring unit 42 configures the working mode of the terminal to the multi-mode multi-standby mode; and if the currently applicable working mode of the terminal is the multi-mode single-standby mode, the configuring unit 42 configures the working mode of the terminal to the multi-mode single-standby mode.

The configuring unit 42 may be specifically configured to automatically configure the working mode of the terminal to the currently applicable working mode of the terminal; or prompt a user to manually configure the working mode of the terminal to the currently applicable working mode of the terminal.

With the multi-mode terminal provided in this embodiment of the present invention, a currently applicable working mode of a terminal can be determined according to a network where the terminal currently camps, and further, a working mode of the terminal is configured to the currently applicable working mode of the terminal, thereby implementing switching between multi-mode single-standby and multi-mode multi-standby, namely, supporting a multi-mode single-standby working mode and a multi-mode multi-standby working mode at the same time, enabling a user to enjoy multiple modes when roaming among different networks, and improving user experience.

Figure 6:
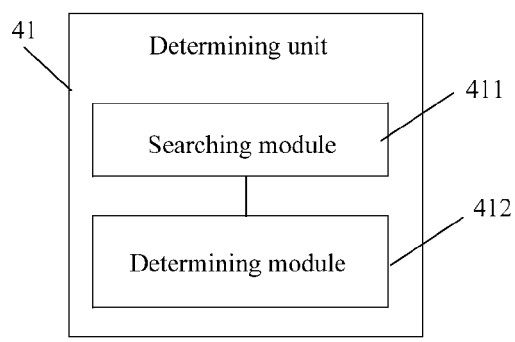
FIG. 6 is a structural block diagram of a determining unit of a multi-mode terminal according to an embodiment of the present invention.

Further, as shown in FIG. 6, the determining unit 41 specifically includes:

a searching module 411, configured to search for a mobile country code and/or a mobile network code of the network where the terminal currently camps; and a determining module 412, configured to determine, according to the mobile country code and/or the mobile network code, the currently applicable working mode of the terminal, definitely, which is not limited in this embodiment of the present invention.

The searching module 411 searches for the mobile country code and/or the mobile network code, so that the determining module 412 can accurately determine the currently applicable working mode of the terminal.

Figure 7:
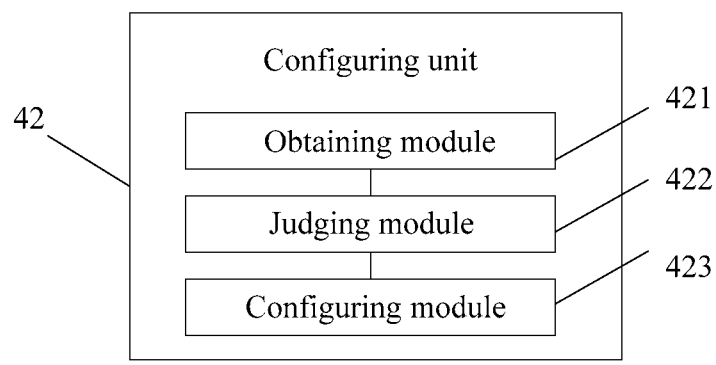
FIG. 7 is a structural block diagram of a configuring unit of a multi-mode terminal according to an embodiment of the present invention.

Further, as shown in FIG. 7, the configuring unit 42 specifically includes:

an obtaining module 421, configured to obtain a working mode that is being used by the terminal;

a judging module 422, configured to judge whether the currently applicable working mode of the terminal is consistent with the working mode that is being used by the terminal; and a configuring module 423, configured to, when the currently applicable working mode of the terminal is inconsistent with the working mode that is being used by the terminal and is obtained by the obtaining module, configure the working mode of the terminal to the currently applicable working mode of the terminal; and configured to, when the currently applicable working mode of the terminal is consistent with the working mode that is being used by the terminal and is obtained by the obtaining module, maintain the working mode that is being used by the terminal unchanged.

Before the terminal is configured, first the judging module 422 judges whether a determined applicable working mode of the terminal is consistent with a current working mode of the terminal, where the current working mode of the terminal is obtained by the obtaining module 421, and the terminal is configured by using the configuring module 423 only when the two working modes are inconsistent, which makes the terminal more intelligent, saves storage space and operation time, and improves user experience.

Through the foregoing description of the embodiments, persons skilled in the art may clearly understand that the present invention may be implemented by software plus necessary universal hardware, and definitely may also be implemented by hardware, but in many cases, the former is preferred. Based on such an understanding, the technical solutions of the present invention essentially, or the part contributing to the prior art may be implemented in the form of a software product. The computer software product is stored in a readable storage medium, for example, a floppy disk, hard disk, or optical disk of a computer, and includes several instructions for instructing a computer device (which may be a personal computer, a server, a network device, or the like) to execute the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A method of a multi-mode terminal, comprising:
   determining a network on which a terminal currently camps, wherein the network is either in a CS (circuit switched) domain or a PS (packet switched) domain, and the terminal includes a plurality of sets of radio frequency channels, wherein each set of radio frequency channels corresponds to a working mode that supports a protocol standard of the network;
   determining, based on the network on which the terminal currently camps, a currently applicable working mode of the terminal, wherein the currently applicable working mode is a multi-mode multi-standby mode or a multi-mode single-standby mode, wherein a single set of radio frequency channels in the plurality of sets of radio frequency channels works in the multi-mode single-standby mode, and multiple sets of radio frequency channels in the plurality of sets of radio frequency channels work at a same time in the multi-mode multi-standby mode; and
   configuring a working mode of the terminal to the currently applicable working mode of the terminal.

2. The method according to claim 1, wherein the determining, according to the network where the terminal currently camps, the currently applicable working mode of the terminal comprises:
- searching for a mobile country code and/or a mobile network code of the network on which the terminal currently camps; and
- determining, according to the mobile country code and/or the mobile network code, the currently applicable working mode of the terminal.

3. The method according to claim 1, wherein the configuring the working mode of the terminal to the currently applicable working mode of the terminal comprises:
- obtaining a working mode that is being used by the terminal;
- judging whether the currently applicable working mode of the terminal is consistent with the working mode that is being used by the terminal; and
- in response to judging that the currently applicable working mode of the terminal is inconsistent with the working mode that is being used by the terminal, configuring the working mode of the terminal to the currently applicable working mode of the terminal.

4. The method according to claim 1, wherein the configuring the working mode of the terminal to the currently applicable working mode of the terminal comprises:
- automatically configuring the working mode of the terminal to the currently applicable working mode of the terminal.

5. The method according to claim 1, wherein the multi-mode multi-standby mode is a multi-mode dual-standby mode.

6. A multi-mode terminal, comprising:
- a determining unit, configured to:
  - determine a network on which the terminal currently camps, wherein the network is either in a CS (circuit switched) domain or a PS (packet switched) domain, and the terminal includes a plurality of sets of radio frequency channels, wherein each set of radio frequency channels corresponds to a working mode that supports a protocol standard of the network, and
  - determine, based on the network on which the terminal currently camps, a currently applicable working mode of the terminal, wherein the currently applicable working mode is a multi-mode multi-standby mode or a multi-mode single-standby mode, wherein a single set of radio frequency channels in the plurality of sets of radio frequency channels works in the multi-mode single-standby mode, and multiple sets of radio frequency channels in the plurality of sets of radio frequency channels work at a same time in the multi-mode multi-standby mode; and
- a configuring unit, configured to configure a working mode of the terminal to the currently applicable working mode of the terminal.

7. The multi-mode terminal according to claim 6, wherein the determining unit comprises:
- a searching module, configured to search for a mobile country code and/or a mobile network code of the network in which the terminal currently camps; and
- a determining module, configured to determine, according to the mobile country code and/or the mobile network code, the currently applicable working mode of the terminal.

8. The multi-mode terminal according to claim 6, wherein the configuring unit comprises:
- an obtaining module, configured to obtain a working mode that is being used by the terminal;
- a judging module, configured to judge whether the currently applicable working mode of the terminal is consistent with the working mode that is being used by the terminal; and
- a configuring module, in response to the currently applicable working mode of the terminal being inconsistent with the working mode that is being used by the terminal and is obtained by the obtaining module, configured to configure the working mode of the terminal to the currently applicable working mode of the terminal.

9. The multi-mode terminal according to claim 6, wherein the configuring unit is configured to automatically configure the working mode of the terminal to the currently applicable working mode of the terminal; or prompt a user to manually configure the working mode of the terminal to the currently applicable working mode of the terminal.

10. The multi-mode terminal according to claim 6, wherein the multi-mode multi-standby mode is a multi-mode dual-standby mode.

11. The method according to claim 1, wherein the configuring the working mode of the terminal to the currently applicable working mode of the terminal comprises prompting a user to manually configure the working mode of the terminal to the currently applicable working mode of the terminal.

* * * * *